(12) United States Patent
Alber et al.

(10) Patent No.: US 10,509,376 B2
(45) Date of Patent: Dec. 17, 2019

(54) METHOD FOR CONTROLLING A PROCESS

(71) Applicant: Endress + Hauser Conducta Gesellschaft für Mess-und Regeltechnik mbH + Co. KG, Gerlingen (DE)

(72) Inventors: Thomas Alber, Stuttgart (DE); Joachim Albert, Leonberg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 756 days.

(21) Appl. No.: 14/952,118

(22) Filed: Nov. 25, 2015

(65) Prior Publication Data

US 2016/0152489 A1 Jun. 2, 2016

(30) Foreign Application Priority Data

Dec. 2, 2014 (DE) .......................... 10 2014 117 690

(51) Int. Cl.
*G05B 15/02* (2006.01)
*C02F 3/00* (2006.01)
*C02F 3/12* (2006.01)

(52) U.S. Cl.
CPC .............. *G05B 15/02* (2013.01); *C02F 3/006* (2013.01); *C02F 3/1215* (2013.01); *C02F 2209/001* (2013.01); *C02F 2209/003* (2013.01); *C02F 2209/005* (2013.01); *C02F 2209/18* (2013.01); *C02F 2209/40* (2013.01); *Y02W 10/15* (2015.05)

(58) Field of Classification Search
CPC .............. G05B 15/02; C02F 2209/005; C02F 2209/18; C02F 2209/40; C02F 3/006;
(Continued)

(56) References Cited

U.S. PATENT DOCUMENTS

| 6,546,295 B1 * | 4/2003 | Pyotsia | G05B 13/024 318/561 |
|---|---|---|---|
| 6,597,958 B1 | 7/2003 | Starr | |
| 2004/0089614 A1 | 5/2004 | Chatelier et al. | |

FOREIGN PATENT DOCUMENTS

| CN | 1050271 A | 3/1991 |
|---|---|---|
| CN | 1170463 A | 1/1998 |

(Continued)

OTHER PUBLICATIONS

Unbehauen, Heinz, Regelungstechnik III, 6., verbesserte Auflage, www.vieweg.de, Oktober 2000, 22 pp. (136-155) (English translation).

(Continued)

*Primary Examiner* — Shogo Sasaki
(74) *Attorney, Agent, or Firm* — Christopher R. Powers

(57) ABSTRACT

A method for controlling a process, comprising treatment of a process medium, and which includes a system input, in particular, an inlet, and a system output, in particular, an outlet for the process includes such a dead time profile that a change in at least one parameter of the first type of the process medium at the system input causes a change in at least one parameter of the second type of the process medium at the system output only after an elapse of a dead time, comprises: determining, in particular, digital values for the parameter of the first type and using these values as input values of a control system; determining the set values for an output variable influencing the parameter of the second type of the process medium at the system output, using the determined values of the parameter of a first type and a first proportionality factor recorded in the control system; applying the determined set values for adjusting the output variable using the control system; determining, in particular, digital values for the parameters of the second type; determining the deviation values, which are representative of a
(Continued)

deviation of the parameter of the second type from the parameter of the first type, from the determined values of the parameter of the first type and the determined values of the parameter of the second type; and use of at least one of the deviation values and at least one of the set values to determine a second proportionality factor.

13 Claims, 1 Drawing Sheet

(58) Field of Classification Search
CPC .............. C02F 3/1215; C02F 2209/001; C02F 2209/003; Y02W 10/15
See application file for complete search history.

(56) References Cited

FOREIGN PATENT DOCUMENTS

| | | |
|---|---|---|
| CN | 101825870 A | 9/2010 |
| CN | 102464426 A | 5/2012 |
| DE | 3929615 A1 | 3/1991 |
| DE | 69408034 T2 | 9/1998 |
| DE | 102011110638 A1 | 2/2013 |

OTHER PUBLICATIONS

First Office Action for Chinese Patent Application No. 201510863879.7, SIPO, dated Dec. 1, 2017, 15 pp. (English Translation).
Search Report for German Patent Application No. 10 2014 117 690.1, German Patent Office, dated Aug. 28, 2015, 3 pp.

* cited by examiner

METHOD FOR CONTROLLING A PROCESS

TECHNICAL FIELD

The invention relates to a method for controlling a process, comprising treatment of a process medium, and an apparatus that is suitable for executing the method.

BACKGROUND DISCUSSION

Process metrology includes a plurality of control and regulation tasks. A particular challenge faced is the regulation of processes that have such a dead time profile between a system input and a system output that a change in at least one parameter of the first type at the system input of the process causes a change in at least one parameter of the second type of the process medium at the system output only after a dead time elapses.

Typical examples of such processes are wastewater treatment processes in wastewater treatment plants. This is illustrated by the example of the phosphate elimination below.

During the addition of precipitant for precipitation of phosphate from wastewater to be treated manually or by means of metering pumps in manual mode, overdosing or underdosing occurs time and again. Underdosage of precipitant leads to increased phosphate concentrations at the wastewater treatment plant outlet. In contrast, overdosage leads to increased formation of hydroxide sludge, whose disposal causes time and expense, and which takes up space in the digester to the disadvantage of the biomass that is beneficial for the biogas. Therefore, it is desirable to avoid over and underdosages of precipitant during phosphate elimination.

Methods of phosphate elimination, in which a simple time control that considers a typical diurnal variation of the phosphate load is applied are known in the prior art. Methods of phosphate elimination, which comprise load-dependent control system of precipitant dosage are also known from the prior art. Such load-dependent control determines the current influx, for example by means of a measurement of the volumetric flow rate, and the phosphate concentration and calculates the precipitant needed for phosphate elimination on the basis of a proportionality factor, for example in the form of a precipitant mass or volumetric flow rate, which must be added using a metering pump, for instance to wastewater flowing into the aeration tank. Besides a safety factor, this proportionality factor essentially includes the product properties of the precipitant.

However, it has been observed that a number of potential sources of error cannot be sufficiently compensated by such controls. For example, the composition of the precipitant varies from batch to batch or the concentration of the precipitant solutions prepared on-site can fluctuate because of errors or inaccuracies in the preparation of the solutions. Changes in the wastewater matrix, i.e. the composition of the phosphate-containing wastewater can also have an impact on the precipitant quantity necessary for the precipitation of a particular phosphate concentration in the wastewater. Activated sludge, which is needed in the biological stage of a wastewater treatment plant can also store phosphate and set free later (simultaneous precipitation), which can occur in varying degrees with changes in the operating conditions. The most serious drawback of the load-dependent control systems known from the prior art is that they do not include monitoring of the effectiveness of the precipitant dosage, i.e., changes in process conditions, for example due to the mentioned sources of error are not recognized by the control system, i.e. not "noticed", and are therefore, not compensable by the control system.

Another way to optimize the precipitant dosage is by regulation of the degraded phosphate quantity with the metered precipitant quantity as an adjustable variable. Such regulations are often configured so that the volumetric flow rate at the inlet to a feed point for the precipitant, which binds ortho-phosphate by a precipitation reaction, is applied as a disturbance variable and the regulator regulates the phosphate concentration at the outlet to a predetermined target value. However, the dead time profile of the process is problematic here.

The dead time profile is based on the fact that in most wastewater treatment plants, the wastewater to be treated requires a certain flow time from the point of precipitant addition up to the measuring point, at which a control variable that can be used for a regulator can be detected. This flow time specifically depends on the local conditions and the type of the precipitation method applied in each case (pre-precipitation, simultaneous precipitation, post-precipitation). Typically, the measuring point at the outlet, where the phosphate concentration is detected, is far from the inlet and from the metering point, where the precipitant is added to the wastewater. The flow time of the wastewater between the inlet and outlet measurement (outlet of the wastewater treatment plant, or between biological level and post-clarification) is usually several hours. Load changes are noticed only at the measuring point in the outlet and therefore, can no longer be compensated for by an increase in the precipitant. In the case of sudden changes in the load, such a regulation responds with delay, so that volumes of wastewater to be treated cannot be avoided in the case of over and underdosing. The large flow times that affect the dead time in the regulated path, also lead to the fact that in case of a variation of the feed stream, the volumetric flow rate that is currently measured at the inlet does not correspond to that at the measuring point and/or the metering point.

Similar problems may also occur in processes other than phosphate elimination, in particular, processes of wastewater treatment or treatment of other process media with a dead time profile due to high flow times.

SUMMARY OF THE INVENTION

Therefore, it is the object of the present invention to provide a generic method which allows improved control and/or regulation of such processes.

This object is achieved by a method for controlling a process which includes a system input and a system output, the method comprising the step of: treatment of a process medium; a dead time profile that a change in at least one parameter of the first type of the process medium at the system input causes a change in at least one parameter of the second type of the process medium at the system output only after elapse of a dead time; determining digital values, for the parameter of the first type and using these values as input values of a control system; determining set values for an output variable influencing the parameter of the second type of the process medium at the system output, using the determined values of the parameter of a first type and a first proportionality factor recorded in the control system; applying the determined set values for adjusting the output variable using the control system; determining digital values, for the parameter of the second type; determining deviation values, which are representative of a deviation of the parameter of the second type from the parameter of the first type, from the determined values of the parameter of the first type and the determined values of the parameter of the second type; and use of at least one of the deviation values and at least one of the set values to determine a second proportionality factor and a device having a method comprising the steps of: treatment of a process medium; a dead time profile that a change in at least one parameter of the first type of the process medium at the system input causes a change in at least one parameter of the second type of the process medium at the system output only after elapse of a dead time; determining digital values, for the parameter of the first type and using these values as input values of a control system; determining set values for an output variable influencing the parameter of the second type of the process medium at the system output, using the determined values of the parameter of a first type and a first proportionality factor recorded in the control system; applying the determined set values for adjusting the output variable using the control system; determining digital values, for the parameter of the second type; determining deviation values, which are representative of a deviation of the parameter of the second type from the parameter of the first type, from the determined values of the parameter of the first type and the determined values of the parameter of the second type; and use of at least one of the deviation values and at least one of the set values to determine a second proportionality factor, the device comprising: at least one first measuring device that is used for determining the values of the parameter of the first type and is located at the system input; an electronic control device that is connected to said at least one first measuring device for receiving values measured by said at least one first measuring device; a control system, said control system being configured to determine set values for an output variable, using the measured values sent by said at least one first measuring device and a first proportionality factor stored in said control system; an adjustment mechanism that is connected with said control system for receiving signals from said control system and is used to set the output variable influencing the parameter of the second type of the process medium at the system output, said control system is configured to transmit the set values determined by said control system to said adjustment mechanism, said adjustment mechanism sets the output variable on the basis of the set values; and a second measuring device that is used for determining the values of the parameter of the second type and is located at the system output, wherein: said control system is connected to the second measuring device for receiving values measured by the second measuring device; and said control system is configured to determine deviation values representing a deviation of the parameter of the second type from the parameter of the first type and to determine a second proportionality factor on the basis of at least one of the deviation values and at least one of the set values.

The inventive method for controlling a process, comprising treatment of a process medium, and the process includes a system input, in particular an inlet for the process medium, and a system output, in particular an outlet for the process medium. The process includes such a dead time profile that a change in at least one parameter of the first type of the process medium at the system input causes a change in at least one parameter of the second type of the process medium at the system output only after a dead time, comprises:

determining values, in particular digital values, for the parameter of the first type and using these values as input values of a control system;

determining set values for an output variable influencing the parameter of the second type of the process medium at the system output, using the determined values of the parameter of a first type and a first proportionality factor recorded in the control system;

applying the determined set values for adjusting the output variable using the control system;

determining values, in particular digital values, for the parameters of the second type;

determining deviation values, which are representative of a deviation of the parameter of the second type from the parameter of the first type, from the determined values of the parameter of the first type and the determined values of the parameter of the second type; and use of at least one of the deviation values and at least one of the set values to determine a second proportionality factor.

This method takes advantage of a control system and eliminates its disadvantages by determining the second proportionality factor. The deviation of the parameter of the second type from the parameter of the first type represents the effect of the output variable on the parameter of the second type, and thus, the effect of the control system. Therefore, the effectiveness of the control system can be checked by comparing the second proportionality factor determined by the deviation values and the set values with the first proportionality factor.

If the process is used, for example, to change a concentration; in particular, the degradation of a specific analyte in the process medium, the parameter of the first type may be, for example, the quantity of a specific analyte in the process medium at the inlet of the process, also referred to as the "analyte load" of the process medium at the inlet, and the parameter of the second type may be the analyte load at the outlet of the process. The difference between these parameters represents the analyte concentration or analyte load that was modified under the influence of the output variable, for example, the reduced analyte load (also simply called "decomposition load"). Thus, the second proportionality factor, which is determined based on the deviation values and the set values, represents a ratio of the actually added and decomposed analyte quantities, for example, the decomposed analyte load, and the output variable in the case of a process used for decomposition of the analyte. It is possible to assess the effectiveness or quality of the control system by comparing the first proportionality factor with the second proportionality factor.

It is also possible to record the second proportionality factor in the control system instead of the first proportionality factor and continue the method with the second proportionality factor. The so-obtained adaptive control can adapt to the changing process conditions (e.g. to a change in the analyte load, other changes in the composition of the process medium, or changes that affect the output variable). In an advantageous embodiment of the adaptive control, the determination of the set values for the output variable using the control system from the newly detected values of the parameter of the first type and the second proportionality factor is continued after recording the second proportionality factor in the control system instead of the first proportionality factor.

In another advantageous embodiment of the method, the values of the parameter of the second type or values of a measured variable included in the parameter of the second type is additionally supplied as a control variable to a controller, wherein the controller determines values of the output variable, based on the comparison of the values of the second type or the values of the measured variable included in the parameter of the second type with a predetermined setpoint value of the output variable, wherein these values of the output variable are included, in particular, additively in the determination of the set values.

The values for the parameter of the first type can be determined in such a way that a sequence of these values represents a chronological sequence of the parameter of the first type. The values for the parameter of the second type can also be determined in such a way that a sequence of these values represents a chronological sequence of the parameter of the second type. According to the sequence of the values for the parameter of the first type, the set values determined from the values for the parameter of the first type result in this case as a sequence, so that the set values represent a chronological sequence of the output variable.

Each of the deviation values can be determined by calculating the difference between a value of the parameter of the first type and a value of the parameter of the second type that is assigned to this value.

In one advantageous embodiment, the determined deviation values are cumulated, in particular, added by a first counter and the determined set values or associated values are cumulated, in particular, added by a second counter. Hence, the counter readings of the first and second counter, respectively, result from the addition of the determined deviation values and the determined set values. The second proportionality factor can be determined at a predetermined point of time on the basis of the counter readings of the first and of the second counter. Subsequently, the counters can be reset to zero and the values detected thereafter can be cumulated again in order to determine a new proportionality factor at another predetermined time. Advantageously, time spans that are considerably larger than the dead time of the process occur between the preset times at which new proportionality factors are determined.

In another embodiment, it is possible to cumulate the sequentially detected values of the first type by the first counter and to cumulate the sequentially determined values of the second type by another counter. In this case, at least one deviation value is determined from the counter readings of the first and of the second counter for the determination of the second proportionality factor. Based on the deviation value(s) and the counter reading of the second counter, the second proportionality factor can be determined by cumulating the set values or associated values.

As already mentioned, the process can be, for example, a method of treating a process medium, by means of which the concentration of an analyte is to be reduced, in particular, changed in a process medium. In this case, the parameter of the first type is, for example, the analyte load at the inlet, the parameter of the second type is, for example, the analyte load at the outlet or downstream to the outlet, and the output variable is one that influences the analyte concentration in the process medium. The variable influencing the analyte concentration can be, for example, a dose of a reactant, which must be added to the process medium and which reacts with the analyte, thus influencing its concentration.

The reactant can be used, for example, to precipitate the analyte. The dose of the reactant may be a solution, for example, a volumetric or mass flow or a volumetric or mass flow rate of a solution that contains a certain concentration of the reactant. The deviation values representing the deviation of the parameter of the second type from the parameter of the first type is an analyte decomposition load.

The process can be, for example, wastewater treatment in a wastewater treatment plant, in particular a method of eliminating phosphate from the wastewater. In this case, the parameter of the first type is a phosphate load, which results from the concentration of phosphate in the effluent and the volumetric flow of the wastewater, at the inlet to a treatment stage of the wastewater treatment plant. In this case, the parameter of the second type is the phosphate load, which results from the phosphate concentration in the wastewater and the volumetric flow of the wastewater, at the outlet of the treatment stage or downstream to the outlet of the treatment stage of the wastewater treatment plant. The output variable may be a variable that is correlated with the dose of precipitant that is fed to the wastewater for precipitation of phosphate, in particular a volumetric or mass flow of the precipitant or a variable that is correlated with a pump output for precipitant dosage. The deviation values represent a phosphate degradation load in this embodiment.

The invention also relates to a device for implementing the method according to one of the embodiments described above, comprising:

at least one first measuring device that is used for determining the values of the parameter of the first type and is located at the system input;

an electronic control device that is connected to the first measuring means for receiving values measured by the first measuring device and comprises a control system, wherein the control system is configured to determine set values for an output variable, using the measured values sent by the measuring device and a first proportionality factor stored in the control system;

an adjustment mechanism that is connected with the control system for receiving signals from the control system and is used to set the output variable influencing the parameter of the second type of the process medium at the system output, wherein the control system is configured to transmit the set values determined by the control system to the adjustment mechanism, wherein the adjustment mechanism sets the output variable on the basis of the set values;

a second measuring device that is used for determining the values of the parameter of the second type and is located at the system output;

wherein the control system is connected to the second measuring device for receiving values measured by the second measuring device, and wherein the control system is configured to determine deviation values representing a deviation of the parameter of the second type from the parameter of the first type and to determine a second proportionality factor on the basis of at least one of the deviation values and at least one of the set values.

The control system may also comprise a controller, which is configured to determine values of the output variable, based on the comparison of the values of the parameter of the second type or values of the measured variable included in the parameter of the second type with a predetermined setpoint value. The control system can be configured in this case to include, in particular additively, the values of the output variable determined by the controller, in the determination of the set values.

The control system may further comprise:

A first counter that is configured to receive and to cumulate, in particular, to add the determined deviation values; and A second counter that is configured to receive and to cumulate, in particular, to add the determined set values or associated values; and An algorithm, which is, in particular in the form present in the software and determines the second proportionality factor on the basis of the counter readings of the first and of the second counter at a certain time.

The control system, the adjustment mechanism and the controller may comprise a data processing unit and an operation program which is executable by the data processing device and is used for implementing the method described above. The combination of the control system and the adjustment mechanism in a single data processing unit are advantageous, for example a PLC, a control computer or a process control center, which is configured for, in particular bidirectional communication with a data processing unit of the adjustment mechanism, in particular a pump control, and which is also configured to receive and evaluate measurement signals from the first and second measuring devices.

If the parameter of the first type is an analyte load at the inlet of a process and the parameter of the second type is an analyte load in the flow of the process and the process is used to influence the concentration of the analyte in the process medium, for example, to reduce the analyte load, then the first measuring device comprise one sensor for detecting the analyte concentration and another sensor for detecting the volumetric or mass flow of the process medium. The second measuring device may comprise one sensor for detecting the analyte concentration and, optionally, another sensor for detecting the volumetric flow or mass flow. In this case, the adjustment mechanism can be a metering device, in particular a pumping device, which is configured to add a dose of a reactant, which is predetermined based on the set values and affects the concentration of the analyte in the process medium, such as a precipitant to the process medium. In this case, the output represents the dose of the reactant to be added, for example, the output variable may be a volumetric or mass flow or output (rpm) of the pump device.

For the measurement of the analyte concentrations at the system input and the system output, a two-channel, automatic measuring device can be used instead of two measuring devices, wherein the former is configured to take samples at the respective measuring point and to determine the analyte concentrations by a chemical/photometric method (e.g. by means of the yellow method or the blue method if the analyte is a phosphate). Such analyzers are, in principle, known from the prior art. It is also conceivable that all control and regulation algorithms for executing the method described above are executed by means of a control unit of the analyzer, wherein the control unit can be provided by an additional flow sensor with a variable that represents the volumetric flow. Furthermore, the control unit is connected to the adjusting mechanism in this embodiment, so as to provide this with the settings determined for the output variable.

BRIEF DESCRIPTION OF THE DRAWINGS

The invention is explained in further detail below on the basis of the embodiment shown in the figures. It shows.

DETAILED DISCUSSION IN CONJUNCTION WITH THE DRAWINGS

Figure 1:
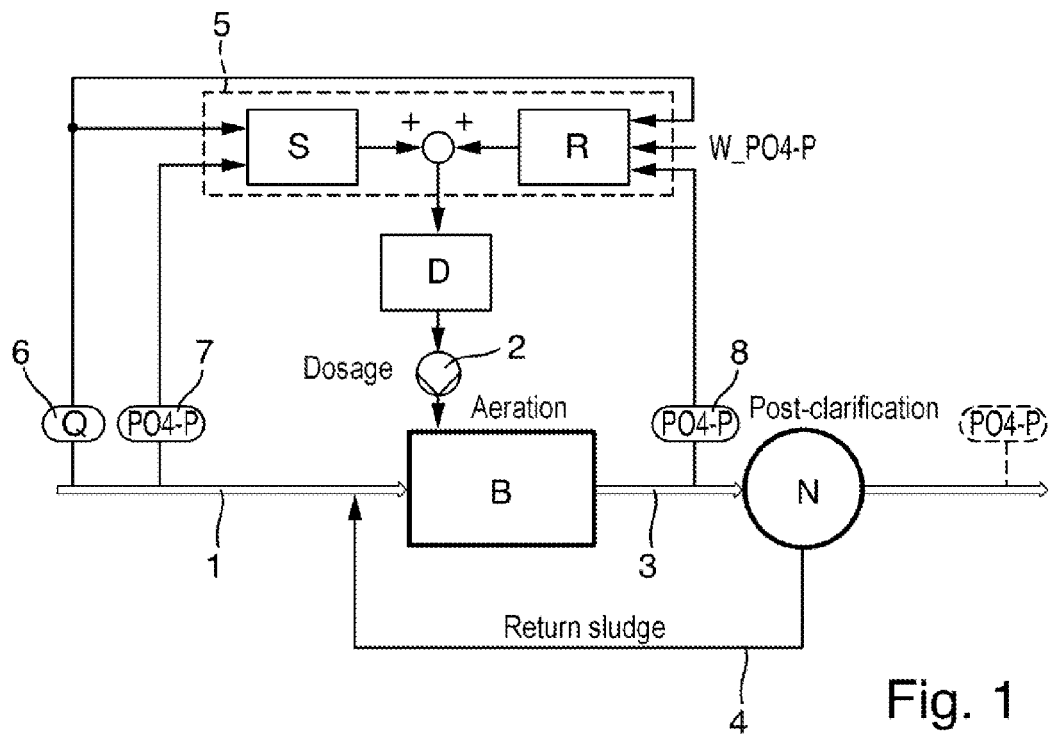
FIG. 1 which is a block diagram of a method for phosphate removal from wastewater in a wastewater treatment plant using combined control and regulation.

FIG. 1 shows schematically, a block diagram for a precipitation of phosphate in a biological treatment stage B of a wastewater treatment plant for wastewater treatment. Although the invention is described in the following with reference to this specific embodiment, it goes without saying that the following explanations are also attributable to the control and regulation of other processes which have a dead time, as explained above. In particular, the invention is applicable to processes for the treatment of a process medium, for example in a wastewater treatment plant, in which a concentration of an analyte should be influenced, in particular reduced in the process medium by means of a control system and/or controller.

In the present example, the wastewater to be treated and whose phosphate content is to be reduced is introduced over the inlet 1 into the biological stage B. The biological stage B also has an outlet 3, over which the wastewater treated in the biological stage B is led to the post-clarification tank N for post-clarification. In the present example, return sludge from the post-clarification tank N can again be fed to the inlet to the biological stage B via the sludge return pipe 4.

The phosphate is eliminated in this example by adding a precipitating agent to the wastewater present in the biological stage B by means of the pump 2. The pump 2 is controlled by a pump control D, which includes an electronic data processing unit, which can execute an operation program in such a way that it operates a pump drive of the pump 2 using predefined settings such that a dose of the precipitant predetermined by the set values is introduced into the biological stage B. The precipitant can be added at any point in the inlet 1 or upstream to the inlet 1. For communication purpose, the pump control D is connected with a superordinate electronic control system 5, which transfers set values for the dosage of the precipitant to the pump control D.

In the inlet 1 to the biological stage B, a first measuring device is arranged, which comprises a flow sensor 6 for detecting measured values of the volumetric flow Q of the wastewater supplied to the biological stage B, and a phosphate sensor 7, which is configured to determine a phosphate concentration of the wastewater in the inlet 1, i.e. upstream to the point where the precipitant is added. The flow sensor 6 may be, for example, a magnetic-inductive flow sensor or another sensor that is suitable for determining the volumetric flow. Such sensors are known from prior art. The phosphate sensor 7 can be configured, for example, as an automated analyzer that is also known from prior art and takes a wastewater sample that assays by reacting with reagents to form a colored reactant, wherein the concentration of the colored reactant, which is a measure of the phosphate concentration in the sample, is determined photometrically. From the concentration of the colored reactant, the automated analyzer then determines the phosphate concentration of the sample. The flow sensor 6 and the phosphate sensor 7 are connected to the superordinate control system 5 for communication and provide the superordinate control system 5 with measured values of the volumetric flow and the phosphate concentration in the inlet 1 via this communication link.

In the outlet 3 of the biological stage B or downstream to the outlet, for example, in the outlet of post-clarification downstream to the biological stage B, another phosphate sensor 8 is arranged, which can be configured in the same way as the phosphate sensor 7 in the inlet 1, and is configured to detect the phosphate concentration in the wastewater leaving the biological stage B via the outlet 3. In a first approximation, it can be assumed that the phosphate concentrations before and after post-clarification are identical and also that the volumetric flow in the inlet and the volumetric flow in the wastewater treatment plant outlet are about the same. The phosphate sensor 8 is also connected to the superordinate control system 5 for communication and provides the superordinate control system 5 with measured values of the phosphate concentration in the outlet 3. Optionally (not implemented in the present example), another flow sensor, which provides the superordinate control system 5 with measured values of the flow of the wastewater in the outlet 3 may also be arranged in the outlet 3. As stated above, it can be assumed that also the volumetric flow in the inlet and the volumetric flow in the wastewater treatment plant outlet are about the same.

The superordinate control system 5 can be configured, for example, as process control computer or as a programmable logic control system. As such a system, it is configured to receive measured values from its associated sensors 6, 7 and 8 and to process them further by means of one or more operating programs present in a memory of the control system 5. Moreover, the control system 5, as already mentioned, is configured to provide the pump control D, acting as the adjustment mechanism, with set values, by means of which the pump control D controls the pump 2 for metering a precipitant dose represented by the set values.

By means of the operating programs present in the control system 5, a control system S and a controller R, which will be described in more detail below are implemented in the control system 5. Of course, the control system and the controller can also be implemented in hardware and/or software outside of the superordinate control device in an alternative embodiment.

The input variable of the control system S is the phosphate load in the inlet 1, which results from the volumetric flow rate Q in the inlet 1 and the phosphate concentration measured in the inlet 1. The phosphate load can be calculated either by the algorithm forming the control system or a preprocessing algorithm executed by the control system 5 and then provided to the control system S.

The control system S is configured to determine precipitant dosage values, which represent the amount of precipitant to be added to the wastewater for precipitating the phosphate load detected in inlet 1, based on the current phosphate load in inlet 1 and a proportionality factor $\beta$ stored in the control system S.

The controller R receives the phosphate concentration, measured in the outlet 3 by the phosphate sensor 8, as a control variable and determines a precipitant dose, based on a deviation of the control variable from the set phosphate concentration W_PO4-P stored in the controller 5 as a reference variable and based on a volumetric flow rate set as an interference variable as the output variable. The precipitant dosage values determined by the controller R are added to the precipitant dosage values determined by the control system and the values formed by adding are transferred as set values to the pump control D used as the adjustment mechanism.

By measuring the phosphate concentration in both the inlet 1 and the outlet 3, it is possible to calculate a "decomposition load", which represents the phosphate amount actually decomposed by the process, by comparing the phosphate loads in the inlet 1 and in the outlet 3. In the simplest case, this allows an evaluation of the effectiveness of the process. In an advantageous embodiment, adaptation of the proportionality factor $\beta$ is also possible by determining the decomposition load, so that the control system S can be configured adaptively. This is explained in more detail below with reference to FIG. 2.

Figure 2:
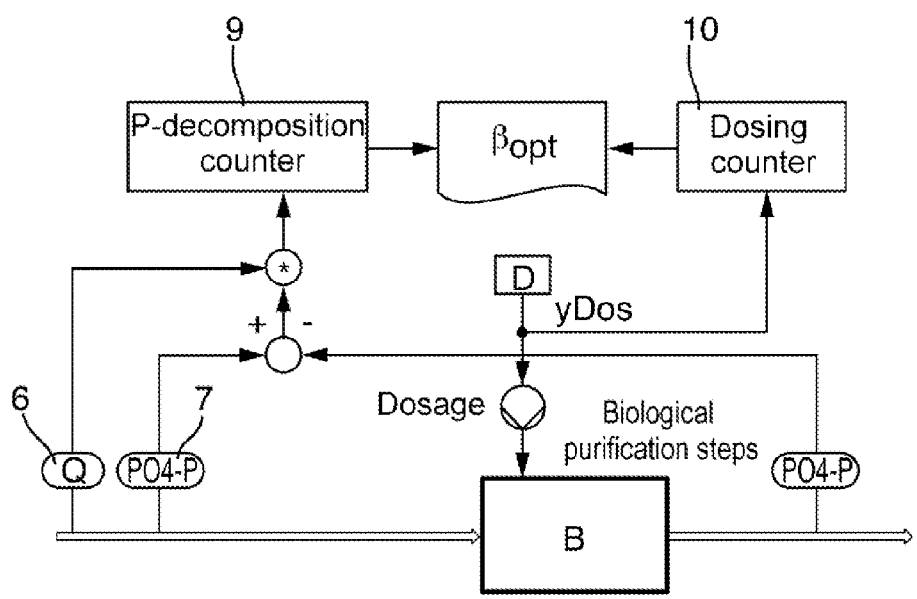
FIG. 2 which is a block diagram for determining a proportionality factor optimized for dosage of the precipitant using the control system with the method shown in FIG. 1.

FIG. 2 shows a block diagram for determining a proportionality factor $\beta_{opt}$ using the phosphate load that is respectively determined for the inlet 1 and the outlet 3. The phosphate load in the inlet 1 can be calculated from the volumetric flow rate Q measured in the inlet and the phosphate concentration PO4-P measured in the inlet 1. The phosphate load in the outlet 3 can be calculated from the phosphate concentration PO4-P measured in the outlet 3 and the volumetric flow rate Q measured in the inlet 1. It is also possible to measure the volumetric flow rate in the outlet 3 again and use it for determining the phosphate load in the outlet 3. The phosphate load in the outlet 3 or downstream to the outlet 3, for example, after post-clarification can be deducted from the phosphate load in the inlet and the phosphate decomposition value representing the decomposed phosphate amount can be determined. The calculation of such phosphate decomposition values is done in accordance with the block diagram shown in FIG. 2 such that the difference between the phosphate concentration PO4-P measured in the inlet and the phosphate concentration PO4-P measured in the outlet 3 is first calculated and then this is multiplied by the volumetric flow rate Q measured in the inlet 1. The phosphate decomposition value determined in this way is supplied to a phosphate decomposition counter 9. The phosphate decomposition counter 9 is configured to cumulate, for example, by summation of a plurality of sequentially determined phosphate decomposition values, which are in turn calculated from a plurality of sequentially determined phosphate load values in the inlet 1 and in the outlet 3.

Furthermore, a dose counter 10, in which the amount of the precipitant added for phosphate decomposition is cumulated, is used to determine the proportionality factor $\beta_{opt}$. For this purpose, the values representing the added amount of the precipitant, for example, the set values predetermined by the pump control D or its associated values can be cumulated, in particular, added in the dose counter 10.

At any given time, either after a predetermined time period, which is stored, for example in the superordinate control system 5, or following an input by an operator in the superordinate control system 5, the proportionality factor $\beta_{opt}$ is determined from the current counter readings, for example, by dividing the counter value the phosphate decomposition counter 9 by the counter reading of the dose counter 10, wherein other factors for the adaptation of the relevant physical units of the counter values may have to be considered, depending on the type of the values accumulated in the counters. It is advantageous if the time period in which the accumulation of the values coming into the counter takes place is significantly longer than the dead time of the process.

The so-determined proportionality factor $\beta_{opt}$ can be used both as a quality index. A strong deviation of $\beta_{opt}$ from the proportionality factor $\beta$ previously used by the control system S may be an indication of a change in the process conditions. Such a change may be due to, for example, a change in the precipitant (wrong delivery, solution errors, overlay), a change in the wastewater matrix or a process error, such as the failure or wear of the metering pump 2. If the deviation exceeds a predetermined threshold, it may be an indication of impending maintenance of the process or trigger an alarm. The issue of such notes on the basis of a threshold comparison can be implemented in the operating software stored in the superordinate control system 5.

Advantageously, an adaptive control can be implemented if the most recently determined proportionality factor $\beta_{opt}$ is stored in the control system instead of the proportionality factor that was previously stored in the control system and used by the latter for determination of the precipitant dosage values, and is used for further determination of the precipitant dosage values. Consistent application of the proportionality factor that is adapted to the actual phosphate decomposition is ensured by the regular determination of $\beta_{opt}$ and the adaptation of the proportionality factor used by the control system in such a way that the control system uses the most recently determined $\beta_{opt}$ for determining the precipitant dosage values in each case. In this case, the additional controller R is a pure safety feature that is intended to meet fluctuations in the phosphate concentration at the outlet that remain uncompensated despite the adaptive control.

Various embodiments of the adaptive control are possible. For example, it may be possible that the phosphate decomposition counter 9 and the dose counter 10 are reset manually by an operator and the newly determined proportionality factor $\beta_{opt}$ is transmitted by a command manually entered by the operator in the superordinate control system 5 to the control system S. Also conceivable is an extension that continuously determines an adapted proportionality factor $\beta_{opt}$ by calculating $\beta_{opt}$ on the basis of values recorded during a continuous predetermined time period, e.g. moving averages, of the phosphate decomposition and the precipitant dose, and provides this adapted proportionality factor to the control system S. In this way, a fully automated adaptive control system is implemented.

The device described here (FIG. 1) and the adaptive control method described, in particular with reference to FIG. 2 may be applied in the identical or a very similar manner for the implementation and control of processes, in which a concentration of an analyte is influenced by an output variable and which have a dead time. Another example of such a process is the nitrogen decomposition in a biological stage of a wastewater treatment plant, in which air is introduced into the effluent to be treated for biodegradation of nitrogen.

The invention claimed is:

1. A method for controlling a treatment process which includes a system input and a system output, the method comprising:
treating a process medium of the process for an analyte, wherein the process includes a dead time such that a change in an input analyte concentration or analyte load of the analyte in the process medium at the system input causes a change in an output analyte concentration or analyte load of the analyte in the process medium at the system output only after elapse of the dead time;
determining first digital values for the input analyte concentration or analyte load using a first measuring device disposed at or near the system input and using the first digital values as input values of a control system that includes an electronic control device;
determining set values, using the control system, for an output variable representing a dose of a reactant to be added to the process medium to react with the analyte, thereby influencing the output analyte concentration or the analyte load at the system output, based on the first digital values and a first proportionality factor recorded in the control system;
adjusting the output variable according to the set values using an adjustment mechanism in communication with the electronic control device;
adding the dose of the reactant represented by the adjusted output variable to the process medium;
determining second digital values for the output analyte concentration or analyte load at the system output using a second measuring device disposed at or near the system output;
determining deviation values representative of a deviation of the output analyte concentration or analyte load at the system output from the input analyte concentration or analyte load at the system input, the deviation values determined from the first digital values and the second digital values using the electronic control device; and
using at least one of the deviation values and at least one of the set values to determine a second proportionality factor using the electronic control device.

2. The method according to claim 1, further comprising:
comparing the second proportionality factor with the first proportionality factor.

3. The method according to claim 1, further comprising:
storing the second proportionality factor in the control system in place of the first proportionality factor.

4. The method according to claim 3, wherein:
determination of the set values for the output variable using the control system from newly determined first values of the input analyte concentration or analyte load and the second proportionality factor is continued after storing the second proportionality factor in the control system in place of the first proportionality factor.

5. The method according to claim 1, wherein:
the second values of the output analyte concentration or analyte load, or values of a measured variable from which the output analyte concentration or analyte load is derived, are additionally supplied as control variables to a controller, the controller configured to determine output values of the output variable based on a comparison of the second digital values, or the values of the measured variable from which the output analyte concentration or analyte load is derived, with a predetermined setpoint value of the output variable; and
output values of the output variable are included additively in the determination of the set values.

6. The method according to claim 1, wherein:
the first digital values are determined such that a sequence of the first digital values represents a chronological development of the input analyte concentration or analyte load; and
the second digital values for the output analyte concentration or analyte load are determined such that a sequence of the second digital values represents a chronological development of the output analyte concentration or analyte load.

7. The method according to claim 1, wherein:
each of the deviation values are determined by calculating the difference between a corresponding first digital value of the input analyte concentration or analyte load and a corresponding second digital value of the output analyte concentration or analyte load.

8. The method according to claim 7, wherein:
the deviation values are cumulated by a first counter;
the set values or associated values are cumulated using a second counter; and
the second proportionality factor is determined at a predetermined time on the basis of counter readings of the first and of the second counter resulting from said cumulating.

9. The method according to claim 1, wherein:
the process is one for treating wastewater in a wastewater treatment plant;

the input analyte concentration or analyte load is an analyte load of an analyte of the wastewater, resulting from the concentration of the analyte in the wastewater and a volumetric flow of the wastewater at the inlet of a treatment stage of the wastewater treatment plant; and the output analyte concentration or analyte load is the analyte load of the wastewater, which is measurable at an outlet of the treatment stage or downstream to the outlet of the treatment stage and results from the concentration of the analyte in the wastewater and the volumetric flow of the wastewater.

10. The method according to claim 9, wherein:

the output variable is a variable influencing the analyte concentration in the wastewater.

11. The method according to claim 9, wherein:

the deviation values represent a decomposition load of the analyte.

12. The method according to claim 9, wherein:

the analyte is phosphate, and the analyte load is a phosphate load.

13. The method according to claim 10, wherein:

the output variable is a volumetric or mass flow of a precipitant.

\* \* \* \* \*